United States Patent [19]

Schulz et al.

[11] Patent Number: 5,284,907

[45] Date of Patent: Feb. 8, 1994

[54] PROCESS FOR THE PREPARATION OF A MASTERBATCH RUBBER HAVING POLYMER BOUND FUNCTIONALITY

[75] Inventors: Gerald O. Schulz, Stow; Dane K. Parker, Massillon, all of Ohio

[73] Assignee: The Goodyear Tire & Rubber Company, Akron, Ohio

[21] Appl. No.: 51,514

[22] Filed: Apr. 22, 1993

Related U.S. Application Data

[63] Continuation-in-part of Ser. No. 784,091, Oct. 24, 1991, abandoned, which is a continuation of Ser. No. 562,062, Aug. 2, 1990, abandoned.

[51] Int. Cl.$^5$ .................................................. C08K 5/49
[52] U.S. Cl. ..................................... 524/710; 524/723; 524/773; 524/776; 524/791
[58] Field of Search ............... 524/710, 723, 773, 776, 524/791

[56] References Cited

U.S. PATENT DOCUMENTS

| | | | |
|---|---|---|---|
| 3,725,332 | 4/1973 | Carrock | 260/31.8 M |
| 3,950,294 | 4/1976 | Connelly et al. | 260/29.6 R |
| 4,701,507 | 10/1987 | Mate et al. | 526/208 |

FOREIGN PATENT DOCUMENTS 59-227934  6/1983  Japan .

*Primary Examiner*—John C. Bleutge
*Assistant Examiner*—Mark D. Sweet
*Attorney, Agent, or Firm*—Bruce J. Hendrick

[57] ABSTRACT

The present invention relates to a process for preparing a masterbatch rubber containing polymer bound functionalized moieties. The process comprises the emulsion polymerization at a temperature from 40° C. to 100° C. of (a) at least one functionalized monomer that contains a polymerizable vinyl group; with (b) at least one copolymerizable conjugated diene monomer selected from the group consisting of butadiene-1,3,2 chlorobutadiene-1,3, isoprene, piperylene and conjugated hexadienes, wherein the polymerization is conducted in the presence of from (1) from 2 to 30 parts by weight of an ionic surfactant per 100 parts by weight of organic components and (2) about 10 to about 70 parts by weight of a plasticizer based on 100 parts by weight of total monomers. Other than the water, ionic surfactant, and the copolymerizable conjugated diene, the plasticizer functions as the sole solvent for the functionalized monomer during the emulsion polymerization and additionally functions as a plasticizer for the final polymer product.

13 Claims, No Drawings

PROCESS FOR THE PREPARATION OF A MASTERBATCH RUBBER HAVING POLYMER BOUND FUNCTIONALITY

This is a Continuation-in-Part Application of application Ser. No. 07/784,091, filed on Oct. 24, 1991, now abandoned, which is a File Wrapper Continuation of application Ser. No. 07/562,062, filed on Aug. 2, 1990, now abandoned.

BACKGROUND OF THE INVENTION

The present invention relates to a process for preparing a masterbatch rubber containing polymer bound functionalities. More specifically, the present invention relates to a process for forming a polymer comprising the emulsion polymerization at a temperature ranging from about 50° C. to 100° C. of (a) at least one functionalized monomer that contains a polymerizable vinyl group with (b) at least one copolymerizable conjugated diene monomer, wherein the polymerization is conducted in the presence of (1) from 2 to 30 parts by weight of an ionic surfactant per 100 parts by weight of organic components and (2) from about 10 to about 70 parts by weight of a plasticizer based upon 100 parts by weight of total monomers. The plasticizer functions as the sole solvent for the functionalized monomer during the emulsion polymerization and also as a plasticizer for the final polymer product.

Polymer bound functionalities, such as antidegradants, have been used in masterbatch rubber. The masterbatch rubber is blended down to the desired level with the rubber in which the antidegradant is intended to function. One route to prepare the masterbatch rubber involves the use of copolymerizable functionalized monomers. Many of these copolymerizable monomers are polar, high melting solids which are only slightly soluble at best in the copolymerizable diene monomers typically employed to prepare rubber. And since these copolymerizable monomers have little, if any, solubility in water and ionic surfactants, the solubility of these chemicals limits the level to which they can be polymerized and thus the extent to which they may be utilized in the masterbatch blending technique.

U.S. Pat. Nos. 3,658,769, 3,767,628 and 4,213,892 describe the preparation of compounds such as N-(4-anilinophenyl) methacrylamide and N-(4-anilinophenyl) acrylamide and the polymerization of such compounds with typical monomers. These references suggest that a solvent such as methylethyl ketone or isopropyl alcohol may be required to obtain adequate solubility of the monomers as well as to solubilize other ingredients. Unfortunately, the use of cosolvents like methylethylketone (MEK) and isopropyl alcohol is limited in emulsion polymerization systems due to the tendency of these solvents to destabilize latex particles resulting in partial coagulation or the formation of multiple phases.

U.S. Pat. No. 4,521,574 discloses the use of dichloromethane (DCM) and/or tetrahydrofuran (THF) as cosolvents in an emulsion polymerization; however, DCM and THF have been determined to be a potential environmental and health concern.

U.S. Pat. No. 4,701,507 disclose the use of methyl isobutyl ketone (MIBK) as a cosolvent in an emulsion polymerization; however, MIBK is also unsuitable in many applications due to its odor and volatile nature. In addition, the use of a solubilizing cosolvent while necessary to dissolve polar, solid copolymerizable monomers in the emulsion polymerization recipe, most often will require its complete removal and economical recycle upon completion of the reaction. The steps of cosolvent addition, removal and recycle make their use inconvenient and costly.

SUMMARY OF THE INVENTION

The present invention relates to a process for the preparation of a masterbatch rubber having polymer bound functionality. The process comprises the emulsion polymerization at a temperature ranging from 40° C. to 100° C. of (a) at least one functionalized monomer that contains a polymerizable vinyl group; with (b) at least one copolymerizable conjugated diene monomer selected from the group consisting of butadiene-1,3, 2-chlorobutadiene-1,3, isoprene, piperylene and conjugated hexadienes; wherein the polymerization is conducted in the presence of from about 10 to about 70 parts of a plasticizer based on 100 parts by weight of total monomers.

DETAILED DESCRIPTION OF THE INVENTION

There is disclosed a process for forming a masterbatch rubber having polymer bound functionality comprising the emulsion polymerization at a temperature ranging from about 40° C. to 100° C. of:

(a) at least one functionalized monomer that contains a polymerizable vinyl group and has a moiety selected from the group consisting of antidegradants, metal deactivators, photosensitizers, pigments, synergists, catalysts, accelerators or combinations thereof; with (b) at least one copolymerizable conjugated diene monomer selected from the group consisting of butadiene-1,3, 2-chlorobutadiene-1,3, isoprene, piperylene and conjugated hexadienes;

wherein the polymerization is conducted in the presence of (1) from 2 to 30 parts by weight of an ionic surfactant per 100 parts by weight of organic components and (2) from about 10 to about 70 parts by weight of a plasticizer based on 100 parts by weight of total monomers and said plasticizer functions as the sole solvent and dispersing agent for said functionalized monomer during the polymerization other than the water and ionic surfactant in the emulsion and said copolymerizable conjugated diene; said plasticizer being selected from:

(A) carboxylic acid esters selected from the group consisting of diesters of triethylene glycol, dibutoxy ethoxy ethyl formate, dialkyl diether glutarate, dibutoxyethyl adipate, dibutoxyethoxyethyl adipate, di-2-ethylhexyl adipate, tetraethylene glycol diheptanoate, propylene glycol dibenzoate, dipropylene glycol dibenzoate, triethylene glycol dibenzoate, butyl octyl phthalate, dimethyl phthalate, diethyl phthalate, dibutyl phthalate, dibutoxy ethyl phthalate, di-2-ethylhexyl phthalate, tetraethylene glycol dioctoate, polyethylene glycol dioctoate, triethylene glycol di-2-ethylhexanoate, tetraethylene glycol di-2-ethylhexanoate, triethylene glycol caprate-caprylate, triethylene glycol di(caprate-caprylate), triethylene glycol dipelargonate, dibutyl sebacate, dibutoxyethyl sebacate, di-2-ethylhexyl sebacate, dioctyl sebacate, diethylene glycol mono-laurate and butoxyethyl oleate; or (B) phosphates selected from the group consisting of 2-ethylhexyl diphenyl phosphate, iso-decyldiphenyl phosphate, tri-n-butyl phosphate, tri(2-ethylhexyl) phosphate, tributoxyethyl phosphate, tricresyl phosphate, trixylenyl phosphate and trixylyl phosphate; or (C) formals selected from the group consisting of dibutoxyethoxy formal and di(butoxy-ethoxyethyl) formal; and (D) N-butylbenzene sulfonamide.

The preferred carboxylic acid esters are polyethylene glycol dioctoate and a diester of triethylene glycol. The preferred phosphate is tributoxyethyl phosphate.

The above plasticizers are commercially available. Representative of the carboxylic acid esters that are sold commercially are Benzoflex TM 2.45, Benzoflex TM 9.88, Benzoflex TM 50, Benzoflex TM 284 and Benzoflex TM S.358 (from Velsicol Chemical), Polycizer TM DBS, Polycizer TM DBP, Polycizer TM DOA, and Polycizer TM DOP, Natro-Flex TM BCA, Plasticizer TM SC, Polycizer TM DOS (from Harwick); Hatcol TM DOA, Hatcol TM 154 and Hatcol TM DOS (from Hatco Chemical); Kodaflex TM DBPO, Kodaflex TM DEP, Kodaflex TM DMP, Kodaflex TM DOA, Kodaflex TM DOP, Kodaflex TM DOTP, Kodaflex TM HS-3, Kodaflex TM TE6-EH and Kodaflex TM TX1B (from Eastman Chemical); Merrol TM 3810, Merrol TM 4200, Merrol TM 4226, Merrol TM 4295, Merrol TM 4700, Merrol TM 4800, Merrol TM DBS and Merrol TM DOS (from Merrand); Monoplex TM DOA and Monoplex TM DOS, PlasHall TM 325, PlastHall TM 203, PlastHall TM 200, PlastHall TM 207, Plasthall TM 226, PlastHall TM DBS, PlastHall TM DOA, PlastHall TM DIOA, PlastHall TM DOZ, PlastHall TM DOS, PlastHall TM 83SS, PlastHall TM 7006, PlastHall TM 7041, PlastHall 7045 and PlastHall TM 4141; TeqMeR TM 803 and TeqMeR TM 804 (from C. P. Hall); Nopalcol TM 1-L, Plastolein TM 9404TGP (from Henkel); Santicizer TM 160 from Monsanto; and SR-650 and SR-660 (from Sartomer), Representative of the phosphates which are sold commercially are KP-140, Kronitex TM 50, Kronitex TM 100, TOF TM and TXP TM (from C.P. Hall), Lindol TM , Phosflex TM 179A, Phosflex TM TBEP and Phosflex TM 179C (from Harwick); Phosflex TM 179, Phosflex TM 390 and Phosflex T-BEP (from Stauffer Chemical); Santicizer TM 141 and Santicizer TM 148 (from Monsanto).

Representative of the formals which are sold commercially are Merrol TM 4221 (from Merrand) and TP-90B TM Plasticizer (from Morton International).

The functionalized monomers have little, if any, solubility in water and the copolymerizable conjugated diene. In addition to the water and the copolymerizable conjugated diene, the above plasticizer functions as the only solvent for the functionalized monomer in the polymerization. The plasticizer also functions as a plasticizer in the final polymer product. The level of plasticizer for use in the present invention may vary. Generally speaking, the level of plasticizer, may range from about 10 to 70 parts by weight of plasticizer per 100 parts by weight of total monomer with a range of from 15 to 50 being preferred, and a range of from 20 to 40 being particularly preferred.

Conventional hot emulsion recipes are employed with the present invention, however, some restrictions and modifications may arise either from the plasticizer, the copolymerizable monomer itself, or the polymerization parameters. Conventional ionic surfactants, known in the art, including sulfonate detergents and carboxylate soaps are useful in the instant invention. The level of ionic surfactant is computed based upon the total weight of the organic components (monomers plus plasticizer) and ranges from 2 to 30 parts by weight of ionic surfactant per 100 parts by weight of organic components with 4-25 parts by weight being more preferred and 5-12 parts by weight being most preferred. Those skilled in the art will appreciate that these levels are higher than usually used.

Free radical initiators known in the art are useful in the instant invention. However, initiators which are strong oxidizing agents, such as persulfate systems, should not be used with certain functionalized monomers, i.e., those functionalized monomers that contain moieties which are readily oxidizable. One example of such a functionalized monomer is N-(4.anilinophenyl) methacrylamide. Examples of free radical initiators that are useful in the practice of this invention are those known as "redox" initiators, such as combinations of chelated iron salts, sodium formaldehyde sulfoxylate and organic hydroperoxides. Representative of organic hydroperoxides are cumene hydroperoxide, paramenthane hydroperoxide and tertiary butyl hydroperoxide. "Azo" initiators, such as azobisisobutyronitrile are preferred.

Hot polymerization recipes are used. The temperature of the polymerization generally ranges from about 40° C. to about 100° C. Preferably, the temperature of the polymerization ranges from about 45° C. to about 80° C., with a range of from about 50° C. to about 70° C. being particularly preferred. Preferably the polymerization is carried out to complete monomer conversion in order to incorporate essentially all of the copolymerizable monomer. Incremental addition, or the use of high levels of a chain transfer agent may be necessary in order to avoid excessive gel formation. Incremental addition of the comonomer(s) may be necessary for complete incorporation of the copolymerizable monomer. Such minor modifications are within the skill of the artisan.

Examples of functionalized monomers that contains an antidegradant moiety and a polymerizable vinyl group are amides having the structural formula:

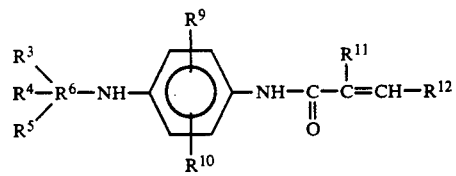

wherein $R^6$ is an aryl radical, $R^3$ and $R^4$ are selected from the group consisting of hydrogen, alkyl radicals having from 1 to 4 carbon atoms and alkoxy radicals having from 1 to 4 carbon atoms, $R^5$ is selected from the group consisting of hydrogen, alkyl radicals having from 1 to 4 carbon atoms, alkoxy radicals having from 1 to 4 carbon atoms and a radical having the following structural formula:

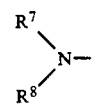

wherein $R^7$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^9$ and $R^{10}$ are hydrogen or alkyl radicals having from 1 to 4 carbon atoms, $R^{11}$ is selected from the group consisting of hydrogen, methyl and ethyl; and $R^{12}$ is hydrogen or phenyl. Preferably $R^3$ is hydrogen, $R^4$ is hydrogen, $R^5$ is hydrogen, $R^6$ is an aryl radical having 6 carbon atoms, $R^9$ is hydrogen, $R^{10}$ is hydrogen, $R^{11}$ is hydrogen or an alkyl having 1 carbon atom and $R^{12}$ is hydrogen.

Other examples of functionalized monomers that contain an antidegradant moiety and a polymerizable vinyl group include imides selected from the group consisting of (1) compounds having the following structural formula:

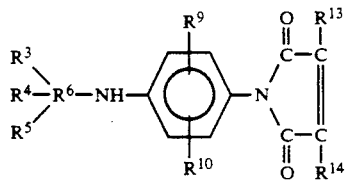

wherein $R^3$, $R^4$, $R^5$, $R^9$ and $R^{10}$ are as previously defined herein under structural formula II and wherein $R^{13}$ and $R^{14}$ are selected from the group consisting of hydrogen and alkyl radicals having from 1 to 14 carbon atoms and (2) compounds having the following structural formula:

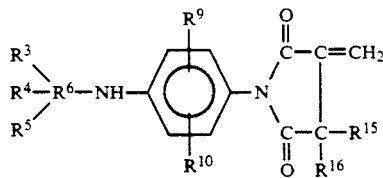

wherein $R^3$, $R^4$, $R^5$, $R^6$, $R^9$ and $R^{10}$ are as previously defined herein under structural formula I and wherein $R^{15}$ and $R^{16}$ are selected from the group consisting of hydrogen and alkyl radicals having from 1 to 4 carbon atoms. Preferably, $R^3$ is hydrogen, $R^4$ is hydrogen, $R^5$ is hydrogen, $R^6$ is an aryl having 6 carbon atoms, $R^9$ is hydrogen, $R^{10}$ is hydrogen, $R^{13}$ is hydrogen, $R^{14}$ is hydrogen, $R^{15}$ is hydrogen, and $R^{16}$ is hydrogen.

Additional examples of functionalized monomers that contain an antidegradant moiety and a polymerizable vinyl group include phenols of the structural formula:

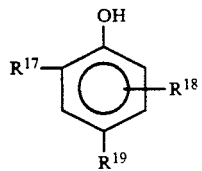

wherein $R^{17}$ and $R^{18}$ is a tert-alkyl radical having from 4 to 8 carbon atoms, $R^{19}$ is selected from the group of radicals:

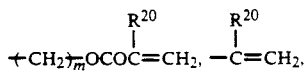

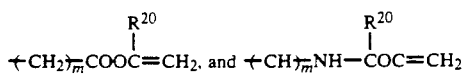

wherein $R^{20}$ is hydrogen or methyl and m is 0 to 3. Preferably, $R^{17}$ is tertiary alkyl having 4 carbon atoms, $R^{18}$ is tertiary alkyl having 4 carbon atoms, $R^{19}$ is:

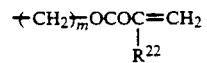

where m is 3 and $R^{20}$ is methyl.

Additional functionalized monomers which contain an antidegradant moiety and a polymerizable vinyl group are compounds with the structural formula:

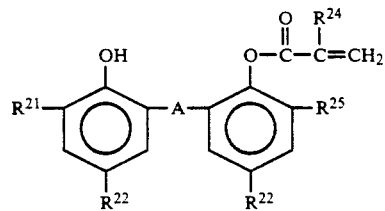

wherein $R^{21}$ and $R^{22}$ are selected from n-alkyl radicals having from 1 to 18 carbon atoms and secondary alkyl radicals having from 3 to 18 carbon atoms and t-alkyl radicals having from 4 to 8 carbon atoms; $R^{24}$ is H, $CH_3$ or $C_2H_5$ and A is selected from the radicals:

$$-CH_2-, \quad -\underset{CH_3}{\underset{|}{CH}}-, \quad -\underset{CH_3}{\overset{CH_3}{\underset{|}{\overset{|}{C}}}}-, \quad -S- \text{ and } -O-.$$

Preferably, $R^{21}$ is tert-alkyl having 4 carbon atoms, $R^{22}$ is an n-alkyl having 1 carbon atom, $R^{24}$ is hydrogen or $CH_3$ and A is $-H_2-$.

Additional functionalized monomers which contain an antidegradant moiety and a polymerizable vinyl group are compounds with the structural formula:

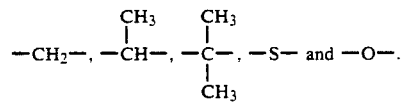

and

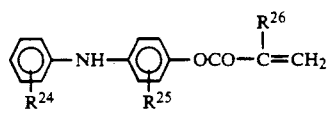

and

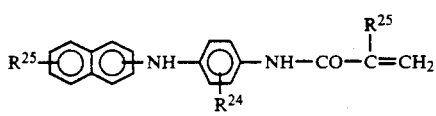

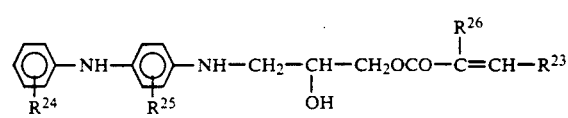

wherein each of $R^{24}$ and $R^{25}$ are alkyl radicals having from 1 to 4 carbon atoms, $R^{26}$ is hydrogen or methyl and $R^{23}$ is hydrogen Or phenyl. Preferably, $R^{24}$ is hydrogen, $R^{25}$ is hydrogen, $R^{26}$ is methyl, and $R^{23}$ is hydrogen.

The aforementioned functionalized monomers may be polymerized by well known free radical polymerization techniques with one or more comonomers that are known to polymerize in free radical initiated polymerization systems. The polymerization is carried out in emulsion type systems. Some adjustments in the polymerization recipe and/or reaction conditions may be necessary to obtain a satisfactory rate of polymer formation, depending on the amount of functionalized monomer included and the other monomers involved. These adjustments should be minimal when using the process of the instant invention and would be within the skill of the artisan.

Examples of comonomers that are useful in the practice of this invention are conjugated diene monomers such as butadiene-1,3, 2-chlorobutadiene-1,3, isoprene, piperylene, and conjugated hexadienes. One may, in addition to the conjugated monomers, use a vinyl monomer such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Mixtures of different functionalized monomers and mixtures of different comonomers may be used. The monomer charge ratio by weight is normally from about 0.10/99.9 to 99.9/0.10 functionalized monomer/conjugated diene monomer (including any additional vinyl monomer). A charge ratio by weight of about 5/95 to about 80/20 is preferred with 10/90 to 40/60 the most preferred. According to one embodiment, the weight ratio of functionalized monomer to conjugated diene monomer to vinyl monomer may range from 5:75:20 to 95:5:0. Ratios will vary depending on the amount of rubber chemical functionality desired to be incorporated and on the reactivity ratios of the monomers in the particular polymerization system used.

The present invention has particular utility in preparing masterbatch polymers that have polymer bound functionalities. The polymer may contain from about 5 parts to about 70 parts by weight of the segmeric form of the functionalized monomer per 100 parts by weight of the polymer, although from 10 parts to 50 parts is normally satisfactory, with from 20 parts to 40 parts being preferred. The remainder of the polymer is comprised preferably of the segmeric form of at least one conjugated diene monomer and optionally the segmeric form of at least one vinyl monomer. Preferably, the polymers contain at least 30 percent by weight of the segmeric form of a conjugated diene with a range of from about 50 to about 90 percent being preferred and a range of from about 60 to 80 percent being particularly preferred.

The process of the present invention has significant advantage over the processes of the prior art. For example, the process of the present invention avoids the use of cosolvents such as DCM and THF which may be hazardous. Use of the present invention also avoids the need for recovery of the organic solvent.

EXAMPLE 1

A series of $9.6 \times 10^{-4}$ m$^3$ (thirty-two ounce) bottles were charged with the following per 100 parts by weight of total monomers (functionalized monomer plus conjugated diene monomer plus vinyl monomer). Total monomer charge was 100 grams.

| Ingredient | Parts |
| --- | --- |
| Water | 220.0 |
| Trisodium phosphate | 0.5 |
| Dehydrogenated rosin acid soap | 15.0 |
| Polymerized sodium alkyl naphthalene sulfonate | 0.5 |
| Azobisisobutyronitrile | 0.8 |
| Tert-dodecylmercaptan | 2.5 |

The water, trisodium phosphate and dehydrogenated rosin acid soap were charged. The pH was adjusted to 10.0 with aqueous KOH solution. The cosolvent was then charged with the functionalized monomer (antidegradant), tert-dodecyl mercaptan followed by azobisisobutyronitrile. Butadiene monomer was then added and the bottles were capped and rotated in a 60° C. polymerization batch for 24 hours. The latices were cooled, filtered and volatiles (in the control) stripped in a rotary evaporator. Stripping was not necessary for Samples 2–4.

Table I sets out the level of the monomers (butadiene and functionalized monomer) and cosolvent added to the bottles in parts by weight per hundred parts by weight based on total monomers. KP-140 is tributoxyethyl phosphate marketed by C.P. Hall. Plasticizer TM SC is a diester of triethylene glycol marked by Harwick. Flexol TM Plasticizer 4GO is polyethylene glycol dioctoate marketed by union Carbide. The functionalized monomer (AO) was N-(4-anilinophenyl) methacrylamide.

TABLE I

| Sample | AO | Butadiene | Cosolvent | Amount of Cosolvent |
| --- | --- | --- | --- | --- |
| 1 | 20 | 80 | MIBK | 40 |
| 2 | 20 | 80 | KP-140 | 20 |
| 3 | 20 | 80 | KP-140 | 40 |
| 4 | 20 | 80 | Plasticizer TM SC | 40 |
| 5 | 20 | 80 | Flexol TM 4G0 | 40 |

The masterbatches were latex blended with Plioflex 1502 SBR (24% bound styrene) which is commercially available from The Goodyear Tire & Rubber Company. The masterbatches were blended to provide a 1.0 phr level of antioxidant. The blends were coagulated in isopropyl alcohol, dried and analyzed thermoxidatively with a temperature program of 2° C./min under a flow of oxygen. The onset temperatures of these blends appear in Table II.

TABLE II

| Sample | Onset Temperature °C. |
| --- | --- |
| 1 | 193 |
| 2 | 199 |
| 4 | 196 |
| 5 | 196 |

What is claimed is:

1. A process for forming a masterbatch rubber having polymer bound functionality comprising the emulsion polymerization at a temperature ranging from about 40° C. to 100° C. of:

(a) at least one functionalized monomer that contains a polymerizable vinyl group and has a moiety selected from the group consisting of antidegradants, metal deactivators, photosensitizers, pigments, synergists, catalysts, accelerators, or combinations thereof; with (b) at least one copolymerizable conjugated diene monomer selected from the group consisting of butadiene-1,3, 2-chlorobutadiene-1,3, isoprene, piperylene and conjugated hexadienes;

wherein the polymerization is conducted in the presence of (1) from 2 to 30 parts by weight of an ionic surfactant per 100 parts by weight of organic components and (2) from about 10 to about 70 parts by weight of a plasticizer based on 100 parts by weight of total monomers and said plasticizer functions as the sole solvent and dispersing agent for said functionalized monomer during the polymerization other than the water and ionic surfactant in the emulsion and said copolymerizable conjugated diene; said plasticizer being selected from:

(A) carboxylic acid esters selected from the group consisting of diesters of triethylene glycol, dibutoxy ethoxy ethyl formate, dialkyl diether glutarate, dibutoxyethyl adipate, dibutoxyethoxyethyl adipate, di-2-ethylhexyl adipate, tetraethylene glycol diheptanoate, propylene glycol dibenzoate, dipropylene glycol dibenzoate, triethylene glycol dibenzoate, butyl octyl phthalate, dimethyl phthalate, diethyl phthalate, dibutyl phthalate, dibutyoxy ethyl phthalate, di-2-ethylhexyl phthalate, tetraethylene glycol dioctoate, polyethylene glycol dioctoate, triethylene glycol di-2-ethylhexanoate, eteraethylene glycol di-2-ethylhexanoate, triethylene glycol caprate-caprylate, triethylene glycol di(caprate-caprylate), triethylene glycol dipelargonate, dibutyl sebacate, dibutoxyethyl sebacate, di-2-ethylhexyl sebacate, dioctyl sebacate, diethylene glycol mono-laurate and butoxyethyl oleate; or (B) phosphates selected from the group consisting of 2-ethylhexyl diphenyl phosphate, iso-decyldiphenyl phosphate, tri-n-butyl phosphate, tri(2-ethylhexyl) phosphate, tributoxyethyl phosphate, tricresyl phosphate, trixylenyl phosphate and trixylyl phosphate; or (C) formals selected from the group consisting of dibutoxyethoxy formal and di(butoxy-ethoxy-ethyl) formal; and (D) N-butylbenzene sulfonamide.

2. The process of claim 1 wherein the monomer charge ratio by weight of functionalized monomer to conjugated diene monomer ranges from about 0.10 to 99.9 to 99.9 to 0.10.

3. The process of claim 1 wherein in addition to said functionalized monomer and said copolymerizable conjugated diene monomer, at least one vinyl monomer is polymerized, said vinyl monomer being selected from the group consisting of styrene, α-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid.

4. The process of claim 3 wherein the weight ratio of functionalized monomer to conjugated diene monomer to vinyl monomer may range from 5:75:20 to 95:5:0 parts per hundred parts based on total monomer.

5. A process according to claim 1 wherein at least one functionalized monomer is from the group consisting of (a) amides having the structural formula:

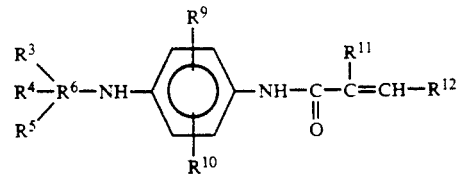

wherein $R^6$ is an aryl radical, $R^3$ and $R^4$ are selected from the group consisting of hydrogen, alkyl radicals having from 1 to 4 carbon atoms and alkoxy radicals having from 1 to 4 carbon atoms, $R^5$ is selected from the group consisting of hydrogen, alkyl radicals having from 1 to 4 carbon atoms, alkoxy radicals having from 1 to 4 carbon atoms and a radical having the following structural formula:

wherein $R^7$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^8$ is selected from the group consisting of hydrogen and alkyl radicals having from 1 to 12 carbon atoms and wherein $R^9$ and $R^{10}$ are hydrogen or alkyl radicals having from 1 to 4 carbon atoms, $R^{11}$ is selected from the group consisting of hydrogen, methyl and ethyl; and $R^{12}$ is hydrogen or phenyl; and (b) imides selected from the group consisting of (1) compounds having the following structural formula:

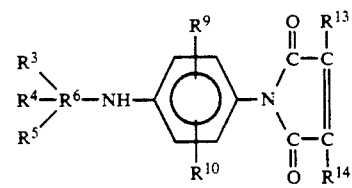

wherein $R^3$, $R^4$, $R^5$, $R^9$ and $R^{10}$ are as previously defined herein under structural formula II and wherein $R^{13}$ and $R^{14}$ are selected from the group consisting of hydrogen and alkyl radicals having from 1 to 14 carbon atoms and (2) compounds having the following structural formula:

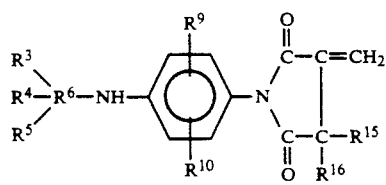

wherein $R^3$, $R^4$, $R^5$, $R^6$, $R^9$ and $R^{10}$ are as previously defined herein under structural formula I and wherein $R^{15}$ and $R^{16}$ are selected from the group consisting of hydrogen and alkyl radicals having from 1 to 4 carbon atoms.

6. A process according to claim 1 wherein the functionalized monomer is selected from the group of compounds represented by the structural formula:

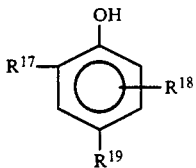

wherein $R^{17}$ and $R^{18}$ is a tert-alkyl radical having from 4 to 8 carbon atoms, $R^{19}$ is selected from the group of radicals:

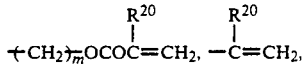

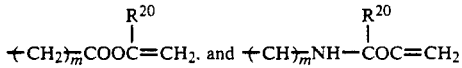

wherein $R^{20}$ is hydrogen or methyl and m is 0 to 3; and compounds with the structural formula:

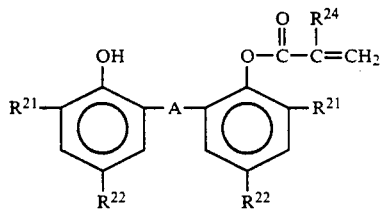

wherein $R^{21}$ and $R^{22}$ are selected from n-alkyl radicals having from 1 to 18 carbon atoms and secondary alkyl radicals having from 3 to 18 carbon atoms and t-alkyl radicals having from 4 to 8 carbon atoms; $R^{24}$ is H, $CH_3$ or $C_2H_5$ and A is selected from the radicals:

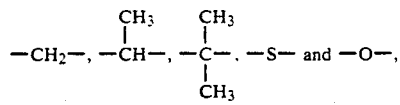

and compounds with this structural formula:

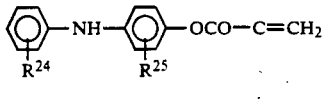

and

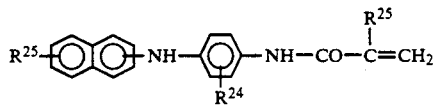

and

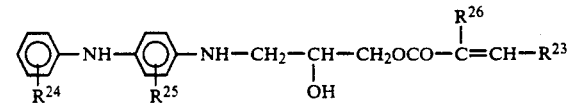

wherein each of $R^{24}$ and $R^{25}$ are alkyl radicals of 1 to 4 carbon atoms, $R^{26}$ is hydrogen or methyl and $R^{23}$ is hydrogen or phenyl.

7. The process of claim 1 wherein 15 to 50 parts by weight of plasticizer per 100 parts by weight of total monomer is used.

8. The process of claim 1 wherein an ionic surfactant is used and is present in an amount ranging from about 2 to 30 parts by weight of ionic surfactant per 100 parts by weight of organic components.

9. The process of claim 8 wherein the amount of ionic surfactant is present in an amount ranging from about 5 to 12 parts by weight of ionic surfactant per 100 parts by weight of organic components.

10. The process of claim 1 wherein said functionalized monomer has an antidegradant moiety.

11. The process of claim 1 wherein said carboxylic acid ester is selected from the group consisting of polyethylene glycol dioctoate and a diester of triethylene glycol.

12. The process of claim 1 wherein said phosphate is tributoxyethyl phosphate.

13. The process of claim 1 wherein the polymerization is at a temperature ranging from about 45° C. to 85° C.

* * * * *